Figure 1:
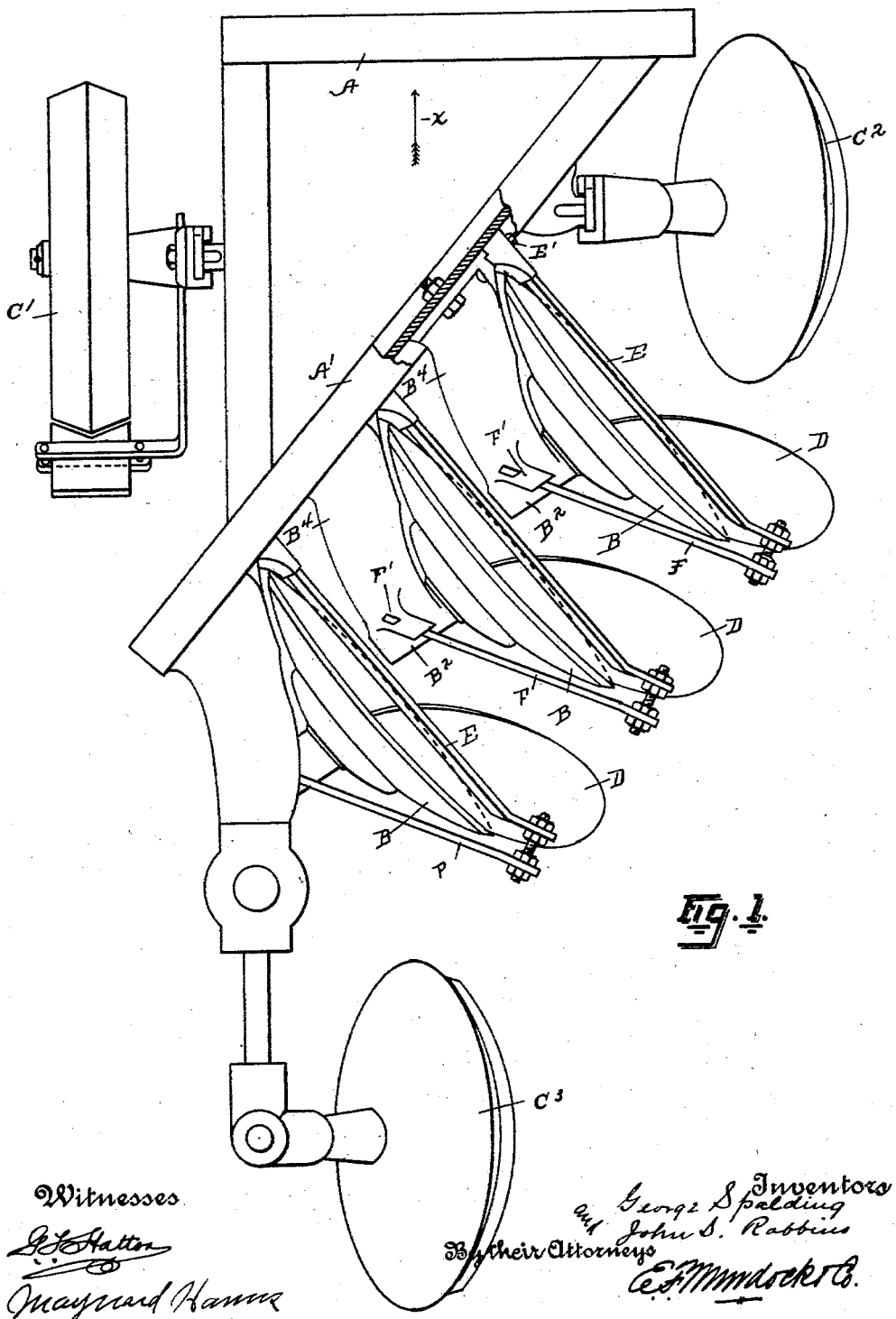

No. 629,137. Patented July 18, 1899.
G. SPALDING & J. S. ROBBINS.
ROTARY DISK PLOW.
(Application filed Oct. 11, 1897.)
(No Model.) 2 Sheets—Sheet 1.

Witnesses
Inventors
George Spalding
John S. Robbins
By their Attorneys

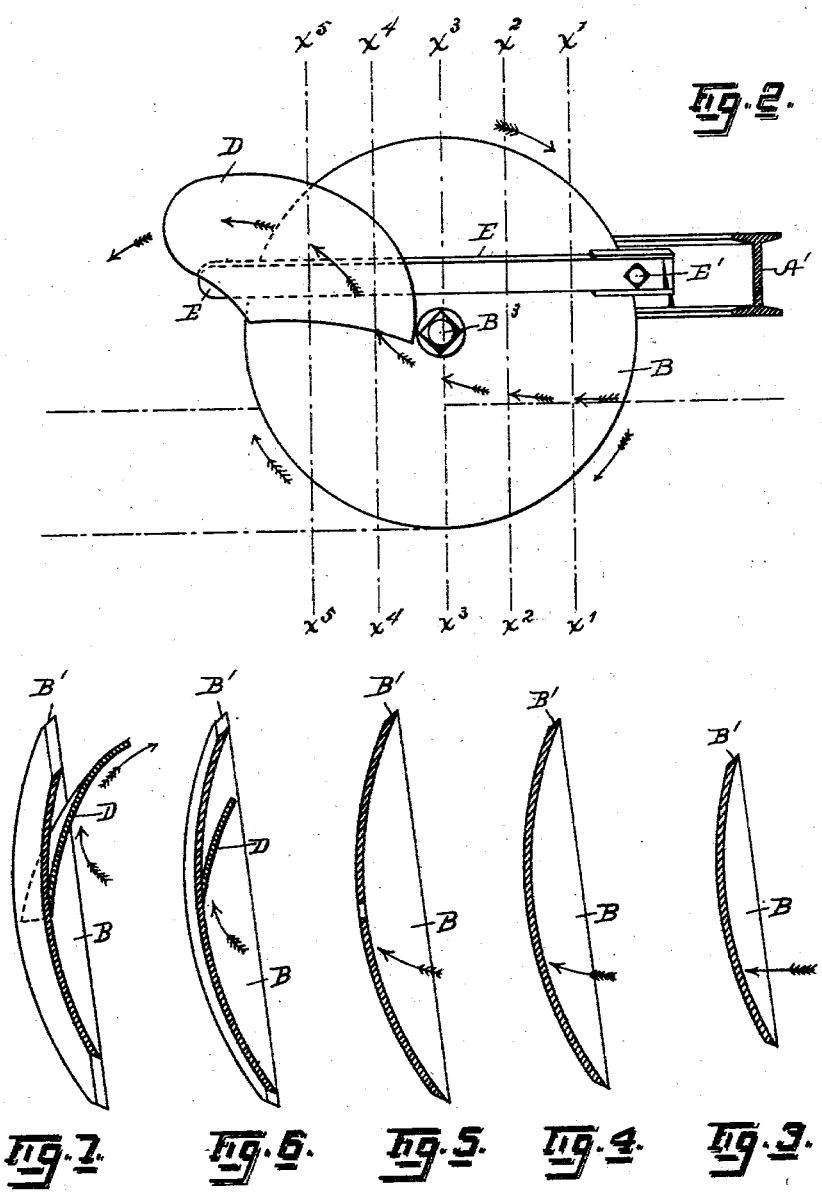

UNITED STATES PATENT OFFICE.

GEORGE SPALDING AND JOHN S. ROBBINS, OF SAN FRANCISCO, CALIFORNIA, ASSIGNORS TO THE SPALDING-ROBBINS DISC PLOW COMPANY, OF SAME PLACE.

ROTARY-DISK PLOW.

SPECIFICATION forming part of Letters Patent No. 629,137, dated July 18, 1899.

Application filed October 11, 1897. Serial No. 654,869. (No model.)

*To all whom it may concern:*

Be it known that we, GEORGE SPALDING and JOHN S. ROBBINS, citizens of the United States, residing in the city and county of San Francisco, in the State of California, have invented certain new and useful Improvements in Rotary-Disk Plows; and we do hereby declare the following to be a full, clear, and exact description of said invention, such as will enable others skilled in the art to which it most nearly appertains to make, use, and practice the same.

This invention relates to improvements to rotary-disk plows.

It has for its objects to cause the disks to enter the ground by reason of the force which is applied to propel the plow, which is commonly termed the "draft;" to turn or invert the furrow which is cut; to so turn or invert the furrow as to produce as little friction as possible, and to provide a device or devices to turn the furrow and attachments therefor which are strong and simple.

The invention consists in providing means for mounting the rotary disks upon the plow-frame in a position which is inclined backward to the top in line with the axis of the disk to present the lowest portion of the disk to the ground at a greater angle, in which position the earth is more readily severed and raised on the body of the disk.

It further consists in shaping the cutting edge of the disk to prevent that portion which is to the rear of the cutting edge coming in contact with the ground at a lower level than the cutting edge, and thereby to act to prevent the insertion of the disk.

It further consists in providing the disk with a stationary moldboard suspended from the frame of the plow to rest against the face of the disk or near the same to remove the earth from the disk and turn it completely over; and it further consists in providing a simple and strong framework by means of which the said moldboard may be suspended in position.

In the drawings, Figure 1 is a plan view of a gang-plow constructed in accordance with this invention. Fig. 2 is a front elevation of one of the disks, looking full into the face of the disk and showing the moldboard in position thereon. Figs. 3, 4, 5, 6, and 7 are sectional views of the disk, taken on the lines $X'$ $X'$, $X^2$ $X^2$, $X^3$ $X^3$, $X^4$ $X^4$, and $X^5$ $X^5$, respectively, of Fig. 5 and each represented from a point of view to the rear of the disk.

Heretofore rotary-disk plows have been provided with various devices, generally termed "scrapers," the office or function of which has been to scrape or remove the coating of dirt which would otherwise adhere to the surface of the disk in moist or sticky soils. In their use in conjunction with disks which have been mounted in the position vertical to the surface of the ground their own surface has been sufficiently inclined to permit the soil to drop from them clear of the disk. They have consisted of straight pieces of metal and wood. While the present invention incidentally serves the same purpose in clearing the surface of the disk, its principal function is to receive and by a graduated curvature to carry the earth away from the disk and to completely invert it. One of the principal objections to which this class of plows has been subjected has heretofore been that after severing the earth of the furrow to be turned it has been carried up the following half of the disk until it has passed the outer and rearmost edge thereof. In this operation the earth has been shattered, but has not been turned completely over—that is to say, the furrow has not been completely inverted, so as to turn the growth of vegetation under to decay. As this is a desired feature in plowing, the absence of it in this form of plows has been seriously objectionable.

For convenience of description with reference to the drawings we will let the letter A designate the frame of the plow, which is constructed substantially as shown in Fig. 1 and preferably of T-shaped steel beams. One of these beams A' is set at an angle to the line of draft, which is indicated in Fig. 1 by the arrow X. This frame is carried upon and supported when in action by the disks B B and the wheels C', $C^2$, and $C^3$, which, however, serve the principal function in this implement of regulating the depth at which the disks B B are to operate. These wheels are constructed so as to operate as weights wherewith to force the disks B B into the ground vertically, except when the wheels are in contact with the ground.

The wheels C² and C³ are here termed "furrow-wheels" and are designed to rest in the bottom of the furrow at either extremity of the disk-beam A'—that is to say, the furrow-wheel C² rests in the bottom of the furrow which has been previously formed by the inside disk B, while the wheel C³ is designed to track in the bottom of the furrow immediately behind the same disk B as the furrow is being formed.

The purpose in providing the wheels C² and C³ is to present to the land side of the furrows in which they are running a pressure to counteract the side draft or the tendency of the plow to move in the direction in which the disks are turned to the line of draft.

The implement being provided with disks B B, set at an angle to the line of draft, and with the furrow-wheels C² and C³, bearing against the solid walls of the earth adjacent to the plowed ground, constitutes a plow in which the furrows are cut or severed from the earth on the one side of the vertical center of the disks and removed therefrom beyond the extension of the disk on the other side of the said vertical center. It is to facilitate the action of the disks B B in this double function of severing the earth and removing it sidewise that is the design in the arrangement of the disks in the inclined position above referred to and of the moldboard D.

As above set forth, the disk in the vertical position of its cutting edge will in its operation and by reason of its bell or concave shape sever the earth and deliver it beyond the edge of the following half of the disk and clear thereof. In performing this function in severing the earth it will, however, be observed that the part of the disk—the bottom or lowermost portion—which is severing the earth is operating at an abrupt angle or nearly vertical angle to the earth. It is with the purpose of presenting that portion of the disk which is thus operating at a more acute angle to the earth that we have inclined the disk backward to the top in the line of the axis of the disk by inclining the bearings B² B². By so doing it will be observed with reference to Figs. 3 to 7, inclusive, that the angle of operation of the surface of the disk is more acute or inclined from the vertical position to the earth which is presented to its surface. By this construction the friction of the earth upon the surface of the disks B B is greatly diminished, it flowing more easily upon and over the said surface. In accomplishing this purpose, however, it has become necessary to prevent any portion of the back of the disk extending below the cutting edge of the same. If this did transpire, that portion would operate as a resistance to the sinking of the disk into the earth and would necessitate adding weight to sink the disk into the earth to the required or desired depth. It would further have the effect of sliding over the bottom of the furrow and tend to produce therein what is termed "wash-ground" or "hard-pan." It is to avoid these objections that the back of the disk directly adjacent to the cutting edge is provided with the straight surface B', this straight surface being at such an angle to the plane of the body portion of the disk that a sharp cutting edge is presented to the earth, as shown in Figs. 3 to 7. By means of thus shaping the cutting edge the rounded surface of the disk directly to the rear of the cutting edge is removed and no portion of the disk except the cutting edge bears against the bottom of the furrow. In operating this cutting edge tears or loosens the earth forming the bottom of the furrow and leaves it in a condition to absorb water and prevent the production of the hard-pan above referred to. By thus inclining the disk as above described two further advantages are gained. First, it is obvious that as the disk is inclined backward the pressure or weight of the earth lifted thereon will have the effect of depressing the disk or of adding to the weight which is being exerted vertically upon the disk. The second-mentioned advantage is that by so inclining the disk the forward cutting edge of the disk is removed farther from the line of the bottom or lowermost point of the disk, thereby increasing the width of the furrow being cut by the disk.

Having severed the earth as described and removed it laterally across the face of the disk, it becomes necessary to compel the earth to make a complete turn or to invert it in leaving the plow. It is for this purpose that we have provided the moldboard D. The lower edge of the moldboard is longitudinally formed, so as to conform to the curve of the "bell" or concave curvature of that portion of the disk which extends from near the nut B³ to the outer edge of the disk. Vertically the moldboard is curved gradually outward or away from the surface of the disk and is extended in this direction considerably beyond the lowermost edge of the disk. To control that portion of the earth which might be carried before being turned beyond the rearmost portion of the disk by the forward movement of the plow, the moldboard is extended considerably to the rear of the disk. To secure the moldboard in position, there is provided a frame consisting of the two bars E and F, to the surface of the former of which the moldboard is bolted. These two braces converge at their free ends and are bolted together to the rear of the moldboard and beyond the disk. At their forward ends the braces E and F are secured to the disk-brackets B⁴. The brace E is rigidly secured to the frame by means of the bolt E', which passes through perforations provided in the said brace and the bracket B⁴. The forward end of the brace F is inserted into an elongated slot formed in a boss which is built up on the rear end of the bracket over the bearing of the disk. As the strain which is produced by the earth in contact with the moldboard tends to lift it vertically away from the ground, it is unnecessary that the end of the brace F should be more rigidly secured, as its office is to resist the upward strain. There is at the same time produced on the moldboard a strain backward from the team, which necessitates the bolting in position of the brace E to prevent it being pulled out of its socket. When in position, the two braces E and F maintain the moldboard rigidly in position. In its operation the disk B, mounted in the inclined position above described and provided with the moldboard D, will, after severing the earth to form the furrow, carry it backward and to one side, lifting it on the following half of the disk, as before described. When now the earth being lifted by the disk reaches the lower edge of the moldboard D, it is thereby caught and caused to travel across the surface of the moldboard until delivered by it laterally beyond the reach of the disk. While accomplishing this operation by which the earth is compelled to travel over the said moldboard vertically, the plow has been moving forward simultaneously. Therefore the actual line of travel of the earth over the moldboard is in a line inclined backward along the surface thereof. As the outward curve of the moldboard becomes gradually greater or more horizontal the earth is gradually compelled to follow the curvature and to become completely inverted, as in the ordinary "share-and-moldboard" plow. In this manner the earth is maintained under control until completely inverted and delivered by the plow constructed in accordance with this invention.

Having thus described this invention, what is claimed is—

In a rotary-disk plow, a frame, a disk journaled thereon, a brace secured to the frame and extending along one side of the disk, a second brace upon the other side of the disk, said second brace having its inner end held in a slot in the frame and being at its outer end secured to the first-mentioned brace, and a moldboard secured to the first-mentioned brace and in operative proximity to the disk for directing earth from the same; substantially as described.

In testimony whereof we have hereunto set our hands this 27th day of September, 1897.

GEORGE SPALDING.
JOHN S. ROBBINS.

Witnesses:
BALDWIN VALE,
MAYNARD HANUS.